(12) United States Patent
Surace

(10) Patent No.: US 10,605,088 B2
(45) Date of Patent: Mar. 31, 2020

(54) AIRFOIL ENDWALL WITH PARTIAL INTEGRAL AIRFOIL WALL

(71) Applicant: United Technologies Corporation, Farmington, CT (US)

(72) Inventor: Raymond Surace, Newington, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 435 days.

(21) Appl. No.: 15/353,930

(22) Filed: Nov. 17, 2016

(65) Prior Publication Data
US 2018/0135420 A1  May 17, 2018

(51) Int. Cl.
*F01D 9/04* (2006.01)
*F01D 5/14* (2006.01)
(Continued)

(52) U.S. Cl.
CPC ............ *F01D 5/147* (2013.01); *F01D 5/187* (2013.01); *F01D 5/282* (2013.01); *F01D 5/284* (2013.01); *F01D 9/041* (2013.01); *F01D 9/065* (2013.01); *F01D 17/162* (2013.01); *F01D 25/12* (2013.01); *F04D 29/023* (2013.01); *F04D 29/324* (2013.01); *F04D 29/542* (2013.01); *F04D 29/563* (2013.01); *F04D 29/582* (2013.01); *F05D 2220/32* (2013.01);
(Continued)

(58) Field of Classification Search
CPC .......... F01D 5/147; F01D 5/282; F01D 5/187; F01D 9/065; F01D 9/041; F01D 17/162; F01D 25/12; F01D 5/284; F04D 29/023; F04D 29/324; F04D 29/582; F04D 29/563; F04D 29/542
See application file for complete search history.

(56) References Cited

U.S. PATENT DOCUMENTS 3,215,511 A   11/1965   Chisholm
4,137,008 A   1/1979    Grant et al.
(Continued)

FOREIGN PATENT DOCUMENTS

EP   0764764   3/1997
EP   1087103   3/2001
(Continued)

OTHER PUBLICATIONS

European Search Report for European Patent Application No. 17202419 completed Feb. 26, 2018.
(Continued)

*Primary Examiner* — Richard A Edgar
*Assistant Examiner* — Maxime M Adjagbe
(74) *Attorney, Agent, or Firm* — Carlson, Gaskey & Olds, P.C.

(57) ABSTRACT

An airfoil includes an airfoil section that defines an airfoil profile. A first endwall piece includes a first cup portion that defines a first cavity. A second endwall piece includes a second cup portion that defines a second cavity and an airfoil wall portion that projects from the second cup portion. The airfoil wall portion forms a portion of the airfoil profile of the airfoil section. An airfoil piece defines another portion of the airfoil profile. The airfoil piece has first and second ends. The first end is disposed in the first cavity and the second end is disposed in the second cavity such that the airfoil piece is trapped between the first endwall piece and the second endwall piece.

20 Claims, 6 Drawing Sheets

(51) Int. Cl.
| | |
|---|---|
| *F01D 5/28* | (2006.01) |
| *F01D 5/18* | (2006.01) |
| *F01D 17/16* | (2006.01) |
| *F01D 25/12* | (2006.01) |
| *F04D 29/32* | (2006.01) |
| *F04D 29/54* | (2006.01) |
| *F04D 29/56* | (2006.01) |
| *F04D 29/02* | (2006.01) |
| *F04D 29/58* | (2006.01) |
| *F01D 9/06* | (2006.01) |

(52) U.S. Cl.
CPC ...... *F05D 2240/12* (2013.01); *F05D 2240/30* (2013.01); *F05D 2240/35* (2013.01); *F05D 2260/20* (2013.01); *F05D 2300/20* (2013.01); *F05D 2300/6033* (2013.01); *Y02T 50/672* (2013.01)

(56) References Cited

U.S. PATENT DOCUMENTS

| | | |
|---|---|---|
| 4,247,259 A | 1/1981 | Saboe et al. |
| 4,396,349 A | 8/1983 | Hueber |
| 4,914,794 A | 4/1990 | Strangman |
| 5,358,379 A | 10/1994 | Pepperman et al. |
| 5,538,380 A | 7/1996 | Norton et al. |
| 5,681,616 A | 10/1997 | Gupta et al. |
| 5,705,231 A | 1/1998 | Nissley et al. |
| 5,951,892 A | 9/1999 | Wolfla et al. |
| 6,000,906 A | 12/1999 | Draskovich |
| 6,102,656 A | 8/2000 | Nissley et al. |
| 6,224,963 B1 | 5/2001 | Strangman |
| 6,316,078 B1 | 11/2001 | Smialek |
| 6,503,574 B1 | 1/2003 | Skelly et al. |
| 6,514,046 B1 | 2/2003 | Morrison et al. |
| 6,543,996 B2 | 4/2003 | Koschier |
| 6,703,137 B2 | 3/2004 | Subramanian |
| 6,709,230 B2 | 3/2004 | Morrison et al. |
| 6,846,574 B2 | 1/2005 | Subramanian |
| 7,104,756 B2 | 9/2006 | Harding et al. |
| 7,316,539 B2 | 1/2008 | Campbell |
| 7,326,030 B2 | 2/2008 | Albrecht et al. |
| 7,435,058 B2 | 10/2008 | Campbell et al. |
| 7,452,182 B2 | 11/2008 | Vance et al. |
| 7,520,725 B1 | 4/2009 | Liang |
| 7,670,116 B1 | 3/2010 | Wilson, Jr. et al. |
| 7,963,745 B1 | 6/2011 | Liang |
| 8,079,806 B2 | 12/2011 | Tholen et al. |
| 8,182,208 B2 | 5/2012 | Bridges, Jr. et al. |
| 8,197,211 B1 | 6/2012 | Liang |
| 8,202,043 B2 | 6/2012 | McCaffrey |
| 8,251,651 B2 | 8/2012 | Propheter-Hinckley et al. |
| 8,366,392 B1 | 2/2013 | Laing |
| 8,480,366 B2 | 7/2013 | Malecki et al. |
| 8,506,243 B2 | 8/2013 | Strock et al. |
| 8,821,124 B2 | 9/2014 | Viens et al. |
| 2006/0228211 A1 | 10/2006 | Vance et al. |
| 2008/0159850 A1 | 7/2008 | Tholen et al. |
| 2010/0068034 A1 | 3/2010 | Schiavo et al. |
| 2010/0136258 A1 | 6/2010 | Strock et al. |
| 2014/0260263 A1 | 9/2014 | Farrell |
| 2016/0090851 A1 | 3/2016 | Carr et al. |

FOREIGN PATENT DOCUMENTS

| | | |
|---|---|---|
| EP | 1764481 | 3/2007 |
| EP | 2105579 | 9/2009 |
| EP | 2500519 | 9/2012 |
| EP | 2853688 | 4/2015 |
| GB | 2272453 | 5/1994 |
| JP | 61066802 | 4/1986 |
| JP | 05321602 | 12/1993 |
| WO | 2017039607 | 3/2017 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.

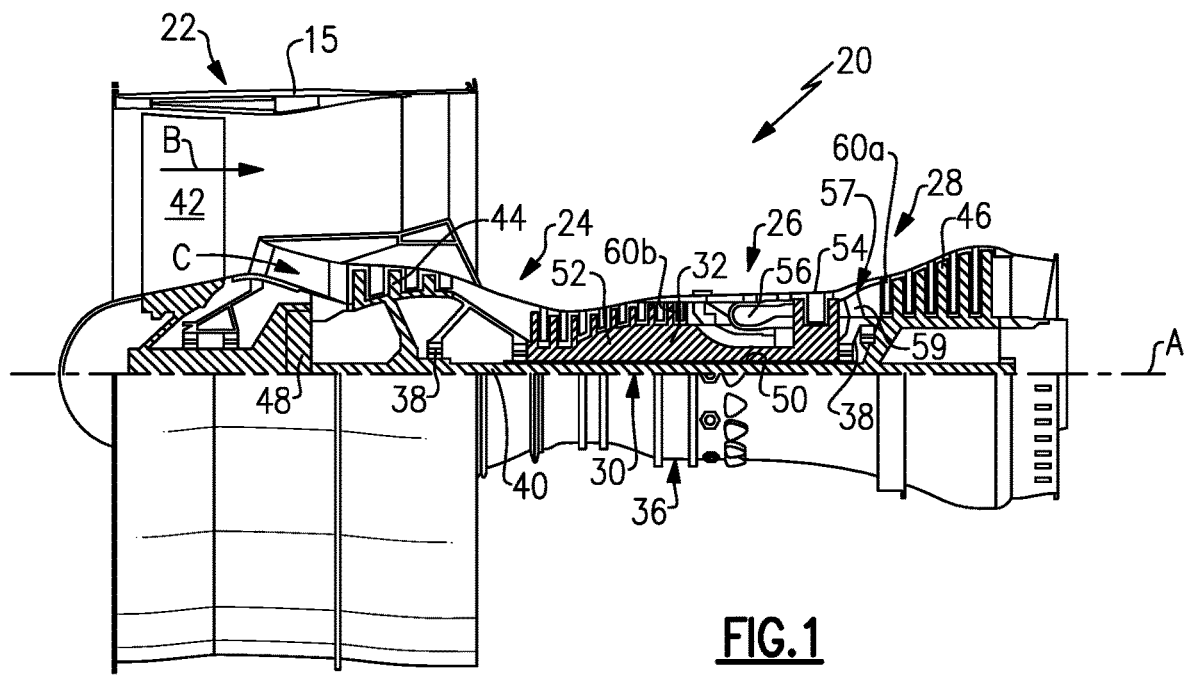
FIG.1
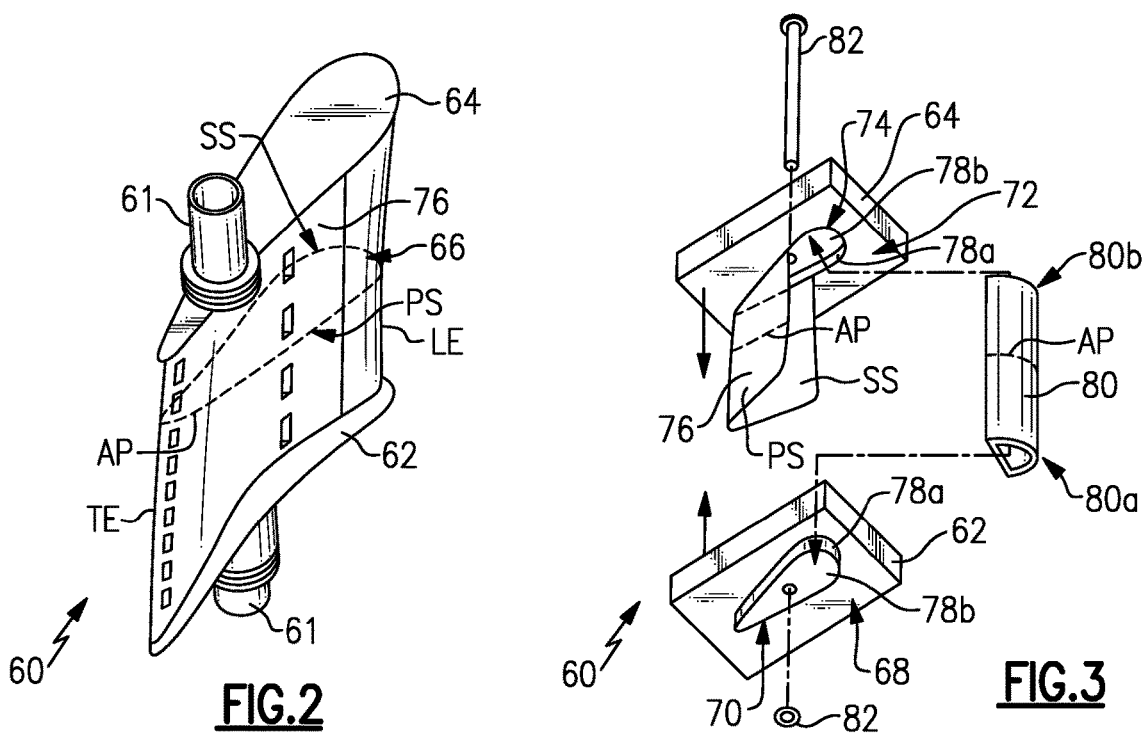
FIG.2
FIG.3

AIRFOIL ENDWALL WITH PARTIAL INTEGRAL AIRFOIL WALL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil section that defines an airfoil profile. A first endwall piece has a first cup portion that defines a first cavity. A second endwall piece has a second cup portion that defines a second cavity and an airfoil wall portion projecting from the second cup portion. The airfoil wall portion forms a portion of the airfoil profile of the airfoil section, and an airfoil piece defines another portion of the airfoil profile. The airfoil piece has first and second ends. The first end is disposed in the first cavity and the second end is disposed in the second cavity such that the airfoil piece is trapped between the first endwall piece and the second endwall piece.

In a further embodiment of any of the foregoing embodiments, the airfoil piece forms a leading end of the airfoil profile.

In a further embodiment of any of the foregoing embodiments, the airfoil piece is ceramic or ceramic matrix composite.

In a further embodiment of any of the foregoing embodiments, at least one of the first cup portion or the second cup portion includes a shoulder supporting the airfoil piece.

In a further embodiment of any of the foregoing embodiments, the one of the first cup portion or the second cup portion that includes the shoulder additionally includes a rib supporting the airfoil piece.

In a further embodiment of any of the foregoing embodiments, the rib includes a cooling passage.

In a further embodiment of any of the foregoing embodiments, the airfoil piece is hollow.

A further embodiment of any of the foregoing embodiments includes a tension member securing the first endwall piece and the second endwall piece together.

In a further embodiment of any of the foregoing embodiments, the airfoil wall portion includes a border wall. The border wall is disposed in the first cavity and partitions the first cavity into a cooling passage.

In a further embodiment of any of the foregoing embodiments, the airfoil wall portion has a lip that is bottomed out in the first cavity.

In a further embodiment of any of the foregoing embodiments, the airfoil wall portion includes a shoulder that abuts the first endwall piece such that an exterior airfoil surface of the airfoil wall portion is substantially flush with an exterior endwall surface of the first endwall piece.

A further embodiment of any of the foregoing embodiments includes a bias member adjacent the airfoil piece and disposed in at least one of the first cavity or the second cavity.

A gas turbine engine according to an example of the present disclosure includes a compressor section, a combustor in fluid communication with the compressor section, and a turbine section in fluid communication with the combustor. One of the turbine section or the compressor section has an airfoil that has an airfoil section that defines an airfoil profile. A first endwall piece has a first cup portion that defines a first cavity, a second endwall piece has a second cup portion defining a second cavity, and an airfoil wall portion projecting from the second cup portion. The airfoil wall portion forms a portion of the airfoil profile of the airfoil section, and an airfoil piece defines another portion of the airfoil profile. The airfoil piece has first and second ends. The first end is disposed in the first cavity and the second end is disposed in the second cavity such that the airfoil piece is trapped between the first endwall piece and the second endwall piece.

In a further embodiment of any of the foregoing embodiments, the airfoil piece forms a leading end of the airfoil profile.

In a further embodiment of any of the foregoing embodiments, the airfoil wall portion includes a border wall. The border wall is disposed in the first cup portion and partitions the first cup portion into a cooling passage.

In a further embodiment of any of the foregoing embodiments, the airfoil wall portion has a lip that is bottomed out in the first cavity.

In a further embodiment of any of the foregoing embodiments, the airfoil wall portion includes a shoulder that abuts the first endwall piece such that an exterior airfoil surface of the airfoil wall portion is substantially flush with an exterior endwall surface of the first endwall piece.

An airfoil article according to an example of the present disclosure has an endwall piece that has a cup portion that defines a cavity and an airfoil wall portion projecting from the cup portion. The airfoil wall portion forms a portion of an airfoil profile.

In a further embodiment of any of the foregoing embodiments, the airfoil wall portion forms a suction side or a pressure side of the airfoil profile.

In a further embodiment of any of the foregoing embodiments, the airfoil wall excludes a leading end of the airfoil profile.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example gas turbine engine.

FIG. 2 illustrates an example airfoil in the gas turbine engine.

FIG. 3 illustrates an exploded view of an airfoil.

DETAILED DESCRIPTION

Figure 4:
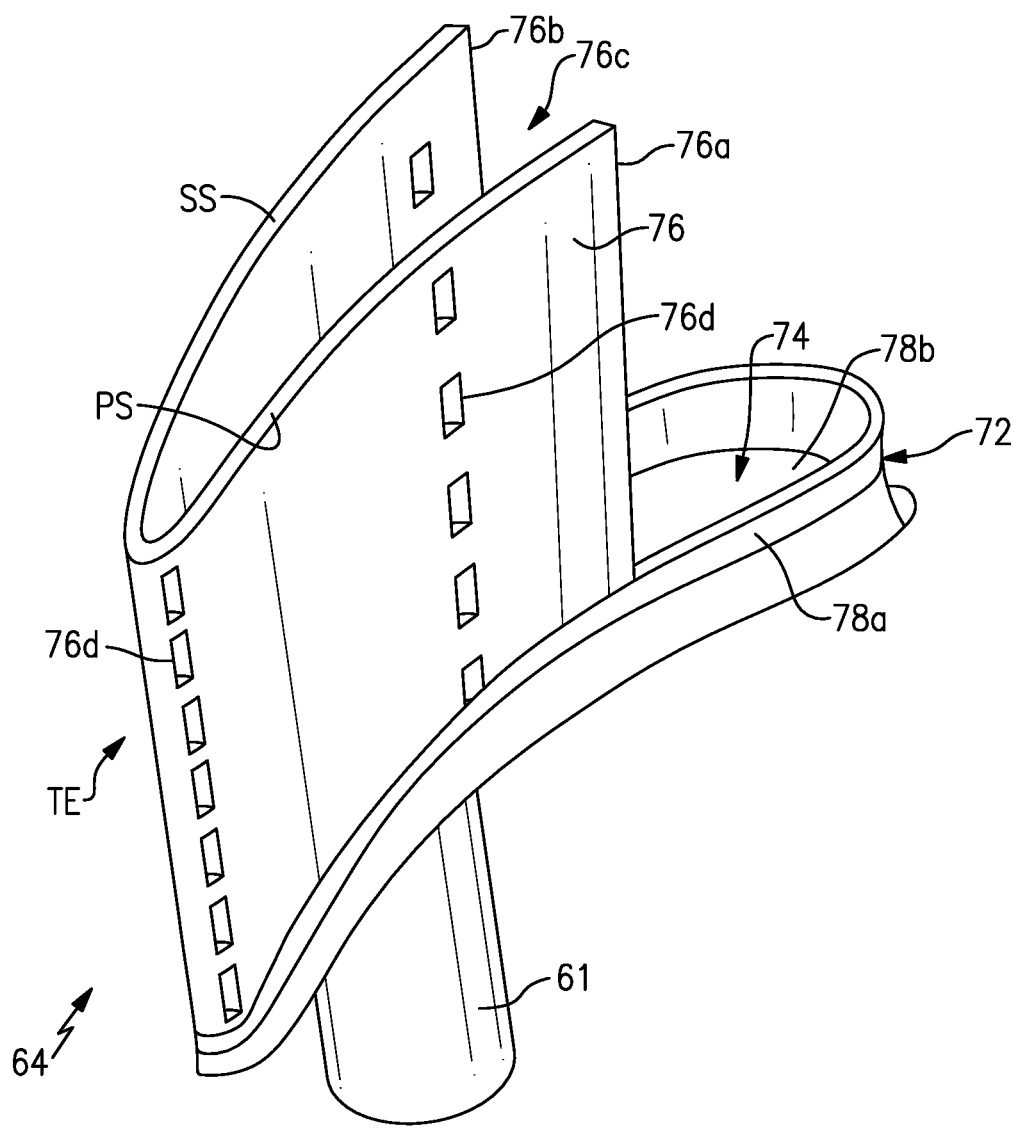
FIG. 4 illustrates an isolated view of an endwall piece with an airfoil wall portion that defines a suction side and a pressure side of an airfoil profile.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }^\circ \text{ R})/(518.7^\circ \text{R})]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

In addition, gas turbine engine operational capability, and the overall efficiency as measured by way of thrust specific fuel consumption (TSFC), may be improved by tailoring the overall pressure ratio of the engine at specific operating conditions via the use of variable area turbine vanes. For example, increasing the flow area of a high pressure turbine variable vane row by rotating some or all of the first stage high pressure turbine vanes to a more open position reduces the engine overall pressure ratio, reducing the high pressure compressor exit temperature, and will permit more fuel to be burned and the aircraft to fly faster. In another example, reducing the flow area of a high pressure turbine variable vane row by rotating some or all of the first stage high pressure turbine vanes to a more closed position increases the engine overall pressure ratio, thus increasing the thermal efficiency of the engine core, allowing the engine to burn less fuel while the aircraft cruises at subsonic speeds.

FIG. 2 illustrates one such component, namely an airfoil 60. For instance, the airfoil 60 can be a high pressure turbine vane, as represented at 60a in FIG. 1, a low pressure turbine vane, or a compressor vane, as represented at 60b in FIG. 1. In this example, the airfoil 60 is a variable vane that can be pivoted about trunnions 61, but the airfoil 60 could alternatively be a static vane. As will be appreciated, although the examples herein are described in the context of a vane, this disclosure is not limited to vanes, and the examples may also be applicable to blades or other airfoils that are exposed to high temperatures.

The airfoil 60 includes first and second endwall pieces 62/64 and an airfoil section 66 that extends radially between the endwall pieces 62/64. The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

FIG. 3 illustrates an exploded view of the airfoil 60, in which the components are shown schematically. The first endwall piece 62 includes a first cup portion 68 that defines a first cavity 70. The second endwall piece 64 includes a second cup portion 72 that defines a second cavity 74 and an airfoil wall portion 76 that projects from the second cup portion 72. The airfoil wall portion 76 forms a portion of the airfoil profile AP of the airfoil section 66. In this example, the airfoil wall portion 76 forms at least portions of the pressure side (PS) and the suction side (SS). Although drawn in FIG. 3 to represent the platforms of a static vane, endwall pieces 62 and 64 may also represent the highly contoured endwall pieces of the a variable, i.e. pivoting, variable vane.

Each of the cavities 70/74 generally includes sidewalls 78a and a bottom wall 78b. The tops of the cavities 70/74, opposite the bottom walls 78b, may be partially or fully open.

An airfoil piece 80 defines another portion of the airfoil profile AP. In this example, the airfoil piece 80 defines at least a portion of the leading end (LE), but could additionally or alternatively include portions of the pressure side (PS) and/or suction side (SS). The airfoil piece 80 has first and second ends 80a/80b. The first end 80a is disposed in the first cavity 70 (as represented by a dashed arrow) and the second end 80b is disposed in the second cavity 74 (as represented by a dashed arrow) such that the airfoil piece 80 is trapped between the first endwall piece 62 and the second endwall piece 64. A tension member 82 can be used to secure the endwall pieces 62/64 together.

In one example, the materials of which the airfoil wall portion 76 and the airfoil piece 80 are formed of are selected to enhance the performance of the airfoil 60. For example, the airfoil wall portion 76 may be formed of a ceramic or of a metal alloy. Metal alloys provide a good combination of strength and durability. Example alloys may include, but are not limited to, nickel alloys, cobalt alloys, a nickel alloy coated with cobalt or cobalt alloy, or non-nickel alloys that do not substantially react with ceramic. The ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. A ceramic matrix composite may also be used.

Most typically, the second endwall piece 64 is a unitary piece and the airfoil wall portion 76 is integral with the second cup portion 72. As an example, the airfoil wall portion 76 and the second cup portion 72 are a monolithic piece, which may be formed by casting or additive manufacturing, for instance. Alternatively, the airfoil wall portion 76 and the second cup portion 72 are initially separate, but are then bonded together, such as by brazing.

The airfoil piece 80 may also be formed of a ceramic listed above or of a metal alloy listed above. The ceramic or metal alloy may be the same or different composition than a ceramic or metal alloy used in the second endwall piece 64. Most typically, the airfoil piece 80 is ceramic and has high temperature resistance and corrosion resistance in comparison to nickel alloys. In further examples, the airfoil piece 80 is formed of a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

If enhanced thermal or environmental resistance is desired, the airfoil wall portion 76 and/or airfoil piece 80 can be coated with a thermal and/or environmental barrier ceramic coating, including but not limited to segmented coatings. As an example, the ceramic may include or may be oxides, carbides, nitrides, borides, silicides, or combinations thereof. In further examples, the ceramic may be or may include yttria stabilized with zirconia, hafnia, and/or gadolinia, gadolinia zirconate, molybdate, alumina, or combinations thereof.

FIG. 4 illustrates an isolated view of the second endwall piece 64. Note that in the illustration of FIGS. 4, 5, and 6 the highly contoured endwall piece of a variable vane is represented. However, endwall piece 64 may also represent the platform of a static vane. In this example, the airfoil wall portion 76 defines the pressure side (PS), the suction side (SS), and the trailing end (TE) of the airfoil profile. In this regard, the airfoil wall portion 76 includes a pressure-side wall 76a and a suction-side wall 76b that is spaced apart from the pressure-side wall 76a to define a cavity 76c there between. The walls 76a/76b in this example extend from the sidewalls 78a of the second cavity 74. The cavity 76c opens to and is in communication with the second cavity 74. The cavity 76c and second cavity 74 may be used to convey cooling bleed air, which may be discharged through cooling holes 76d. As will be appreciated, the size, number, and location of the cooling holes 76d will depend on cooling requirements, and in some examples the airfoil wall portion 76 may not have any cooling holes.

Figure 5:
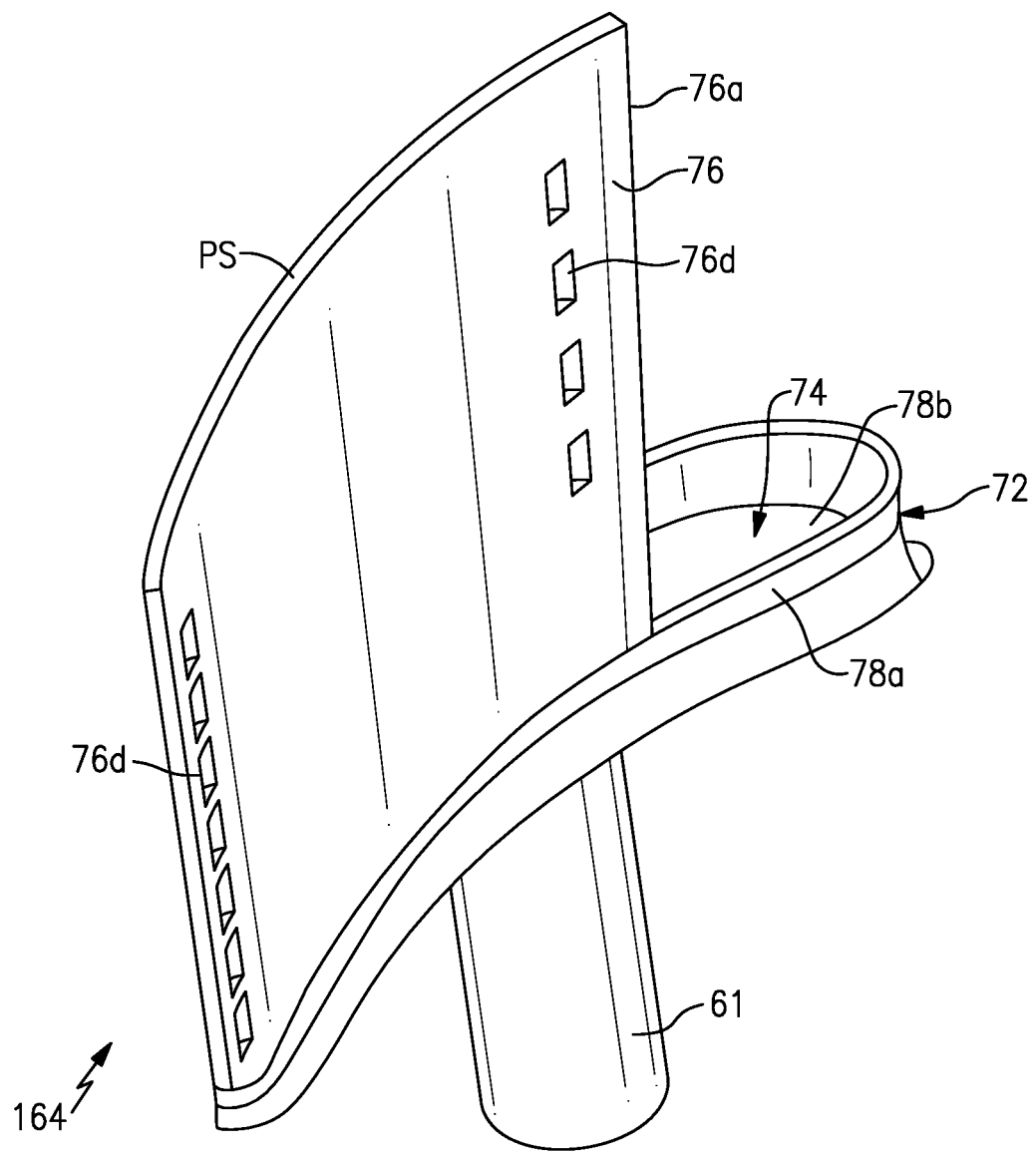
FIG. 5 illustrates an isolated view of an endwall piece with an airfoil wall portion that defines a pressure side of an airfoil profile.

The portion of the airfoil profile that the airfoil wall portion 76 defines, or does not define, may vary. For instance, FIG. 5 illustrates another example of a second endwall piece 164. In this disclosure, like reference numerals designate like elements where appropriate and reference numerals with the addition of one-hundred or multiples thereof designate modified elements that are understood to incorporate the same features and benefits of the corresponding elements. In this example, the airfoil wall portion 76 includes the pressure-side wall 76a but not the suction-side wall 76b. The airfoil wall portion 76 thus defines the pressure side (PS) of the airfoil profile but not the suction side (SS). The suction side (SS) may be defined by an airfoil wall on the first endwall piece 62 or a panel or piece that is separate and distinct from the endwall pieces 62/64.

Figure 6:
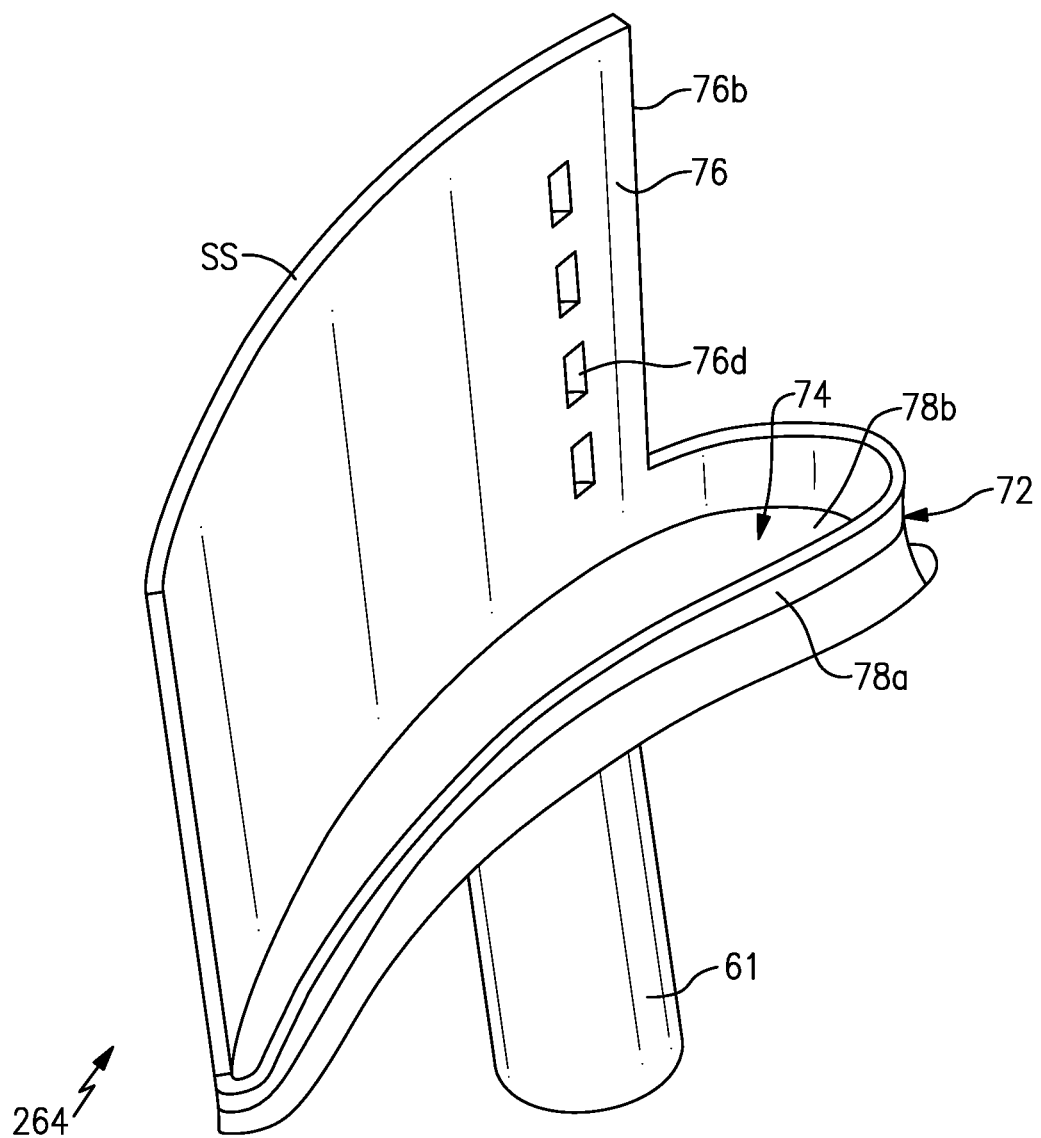
FIG. 6 illustrates an isolated view of an endwall piece with an airfoil wall portion that defines a suction side of an airfoil profile.

FIG. 6 illustrates another example of a second endwall piece 264. In this example, the airfoil wall portion 76 includes the suction-side wall 76b but not the pressure-side wall 76a. The airfoil wall portion 76 thus defines the suction side (SS) of the airfoil profile but not the pressure side (PS). The pressure side (PS) may be defined by an airfoil wall on the first endwall piece 62 or a panel or piece that is separate and distinct from the endwall pieces 62/64.

It will be appreciated that the aforementioned examples of the second endwall piece 64/164/264 are also applicable to the first endwall piece 62. Moreover, any of the endwall pieces herein may be produced individually as new parts for an original airfoil or as replacement parts for an existing airfoil.

Figure 7:
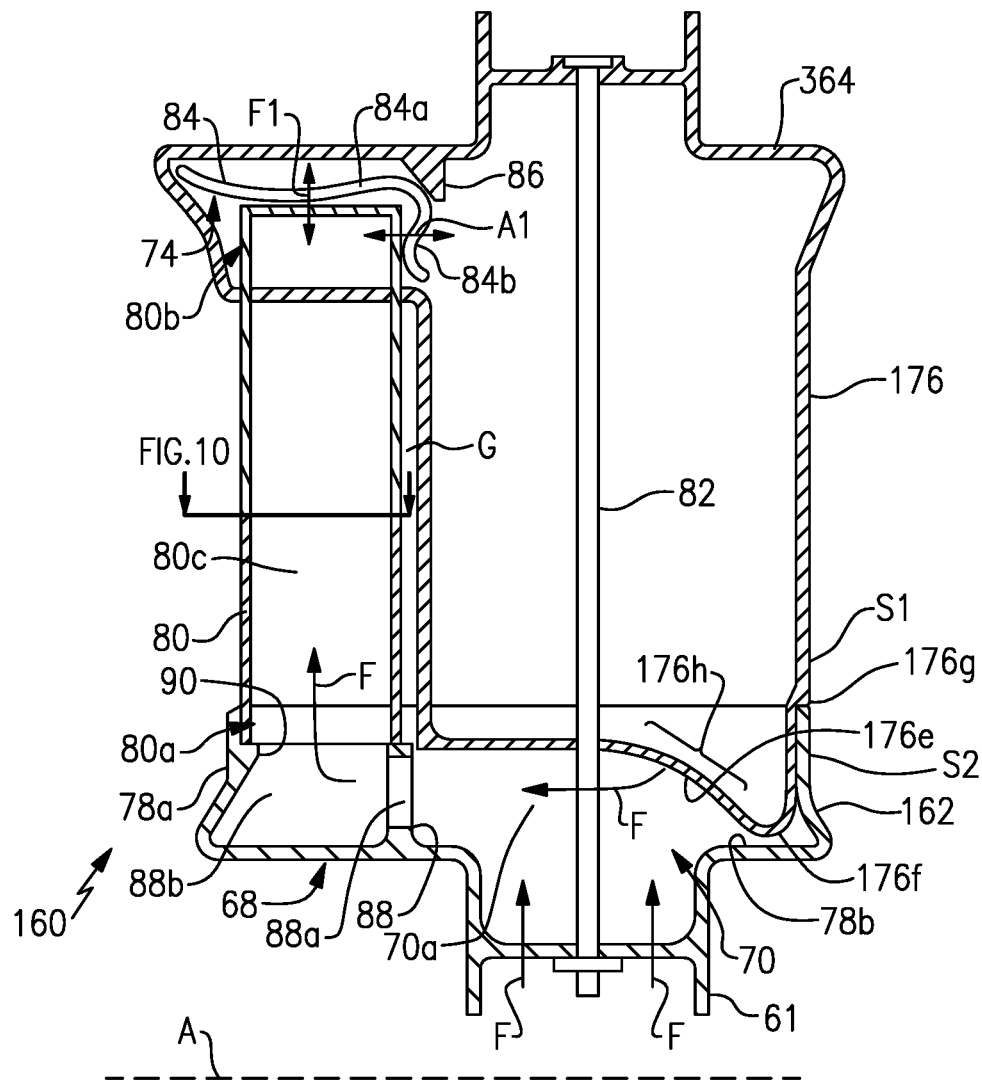
FIG. 7 illustrates a sectioned view of another example airfoil.

FIG. 7 illustrates a sectioned view of another example of an airfoil 160. In this example, the first endwall piece 162 and the second endwall piece 364 are secured together by tension member 82 to trap the airfoil piece 80 there between, as discussed above. A bias member 84 is located adjacent the airfoil piece 80 and disposed in the second cavity 74 of the second endwall piece 364. As an example, the bias member 84 is a spring. The bias member 84 maintains a compression force on the airfoil piece 80. In particular, during engine operation there is thermal growth and contraction of the airfoil piece 80, the first endwall piece 162, and the second endwall piece 364. Where dissimilar materials are used for these components, such as metal alloys for the endwall pieces 162/364 and ceramic for the airfoil piece 80, there may be a thermal growth/contraction mismatch. The bias member 84 maintains compression force over the range of thermal growths and contractions during engine operation. For instance, the thermal growths and contractions can readily be determined from defined maximum and minimum temperatures during engine operation in order to calculate or estimate a thermal growth/contraction mismatch distance. The bias member 84 is configured to provide the compression force over at least that distance.

Figure 8:
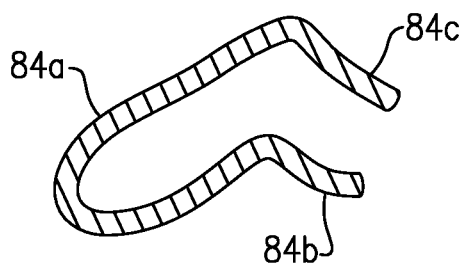
FIG. 8 illustrates an isolated view of a bias member that is used in the airfoil of FIG. 7.

The bias member 84 is also configured to facilitate maintaining the position of the airfoil piece 80. For example, as shown also in an isolated view of the bias member 84 in FIG. 8, the bias member 84 has a U-shaped body portion 84a and first and second arms 84b/84c that project laterally off of the legs of the "U." As shown in FIG. 7, the body portion 84a provides a radial compression force F1. The arms 84b/84c wrap around the aft side of the airfoil piece 80 and abut a stop 86 in the second cavity 74 of the second endwall piece 364. The arms 84b/84c thus provide an axial compression force A1 on the airfoil piece 80, to facilitate maintaining the axial position of the airfoil piece 80. For instance, the airfoil piece 80 is secured in a position that is axially spaced apart from the airfoil wall portion 176 to establish a gap G there between. The gap G may be used to distribute cooling bleed air. Gap G may be partially or substantially sealed to meter cooling bleed air and/or to restrict hot gaspath flow from migrating from the PS of the airfoil through gap G to the SS of the airfoil.

Referring again to FIG. 7, the airfoil wall portion 176 of the second endwall piece 364 includes a border wall 176e that is disposed in the first cavity 70. The border wall 176e forms a lip 176f that bottoms out on the bottom wall 78b, which serves as a relative positioning mechanism between the endwall pieces 162/364. The airfoil wall portion 176 includes a shoulder 176g that abuts the first endwall piece 162 such that an exterior airfoil surface S1 of the airfoil wall portion 176 is substantially flush with an exterior endwall surface S2 of the first endwall piece 162.

Figure 9:
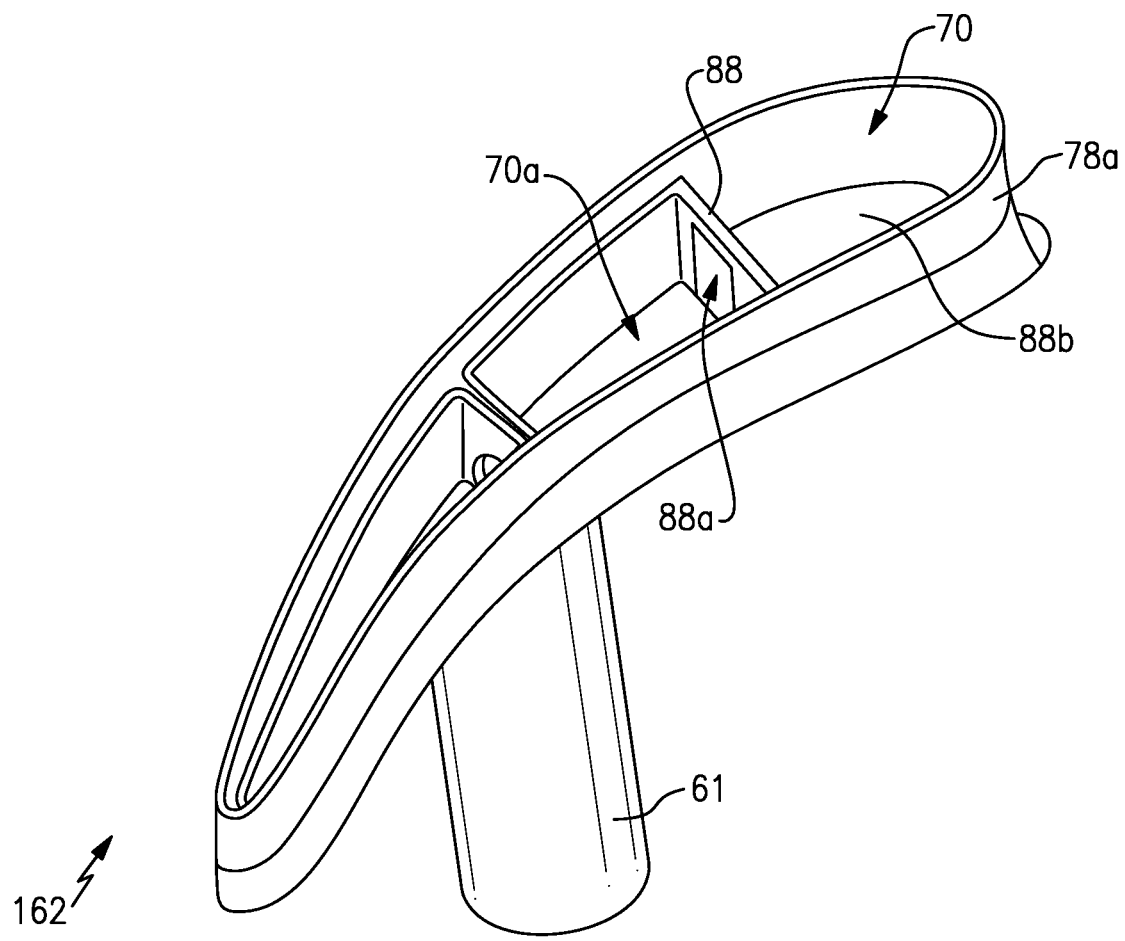
FIG. 9 illustrates an isolated view of an endwall piece that is used in the airfoil of FIG. 7.

The border wall 176e spans laterally and partitions the first cavity 70 into a cooling passage 70a. The cooling passage 70a may receive cooling bleed air (F) through the trunnion 61. The cooling bleed air (F) flows primarily radially upon entering the airfoil 160. The border wall 176e is sloped (as represented at 176h) and deflects the cooling bleed air (F) forward in the cooling passage 70a toward a rib 88 in the first cup portion 68 of the first endwall piece 162. The rib 88 is also shown in an isolated view of the first endwall piece 162 in FIG. 9. The rib 88 includes a cooling hole or passage 88a, which permits the deflected cooling bleed air (F) to continue forward into a forward sub-cavity 88b of the first cavity 70 that is defined by a portion of the sidewalls 78a and the rib 88. The sub-cavity 88b is radially inboard of the airfoil piece 80.

Figure 10:
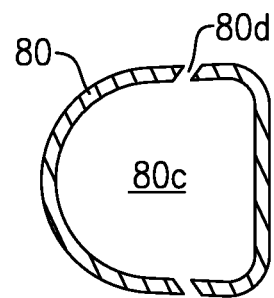
FIG. 10 illustrates a sectioned view of an airfoil piece that is used in the airfoil of FIG. 7.

The airfoil piece 80 is hollow and includes an internal passage 80c, which is also shown in the sectioned view in FIG. 10. The cooling bleed air flow (F) flows into the passage 80c and may be discharged through cooling holes 80d in the airfoil piece 80. As discussed above, the first end 80a of the airfoil piece 80 is disposed into sub-cavity 88b of first cavity 70 and the second end 80b is disposed in the second cavity 74. In this example, the first cup portion 68 of the first endwall piece 162 includes a shoulder 90 that supports the airfoil piece 80. In this example, the forward edge of the first end 80a of the airfoil piece 80 sits on the shoulder 90. The aft edge of the first end 80a sits on the rib 88. The shoulder 90 and the rib 88 thus cooperate to properly seat the airfoil piece 80. Alternatively, the shoulder 90 and the rib 88 cold be provided in the second endwall piece 364, and the bias member 84 in the first endwall piece 162.

As can be appreciated from this disclosure, the airfoil 60/160 has relatively few components and is thus easy to assemble. Moreover, different locations of the airfoil profile and can formed of different materials that are tailored to the environmental conditions at the particular locations.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section defining an airfoil profile;
a first endwall piece including a first cup portion defining a first cavity;
a second endwall piece including a second cup portion defining a second cavity and an airfoil wall portion projecting from the second cup portion, the airfoil wall portion forming a portion of the airfoil profile of the airfoil section, the airfoil wall portion including a border wall that is sloped, the border wall being disposed in the first cavity and partitioning the first cavity into a cooling passage; and
an airfoil piece defining another portion of the airfoil profile, the airfoil piece having first and second ends, the first end being disposed in the first cavity and the second end being disposed in the second cavity such that the airfoil piece is trapped between the first endwall piece and the second endwall piece, wherein at least one of the first cup portion or the second cup portion includes a shoulder supporting the airfoil piece, and the one of the first cup portion or the second cup portion that includes the shoulder additionally includes a rib supporting the airfoil piece.

2. The airfoil as recited in claim 1, wherein the airfoil piece forms a leading end of the airfoil profile.

3. The airfoil as recited in claim 2, wherein the airfoil piece is ceramic or ceramic matrix composite.

4. The airfoil as recited in claim 1, wherein the rib includes a cooling passage.

5. The airfoil as recited in claim 1, wherein the airfoil piece is hollow.

6. The airfoil as recited in claim 1, further comprising a fastener securing the first endwall piece and the second endwall piece together.

7. The airfoil as recited in claim 1, wherein the airfoil wall portion has a lip that is bottomed out in the first cavity.

8. The airfoil as recited in claim 1, wherein the airfoil wall portion includes a shoulder that abuts the first endwall piece such that an exterior airfoil surface of the airfoil wall portion is substantially flush with an exterior endwall surface of the first endwall piece.

9. The airfoil as recited in claim 1, further comprising a spring adjacent the airfoil piece and disposed in at least one of the first cavity or the second cavity.

10. The airfoil as recited in claim 1, wherein the border wall is situated opposite a trunnion through which cooling air is provided into the first cavity such that the cooling air impinges upon the border wall.

11. The airfoil as recited in claim 10, wherein the border wall deflects cooling air toward a leading end of the airfoil section.

12. The airfoil as recited in claim 11, wherein the rib includes a cooling hole and is situated forward of the border wall to receive the deflected cooling air.

13. The airfoil as recited in claim 12, wherein the cooling hole in the rib opens into a forward sub-cavity of the first cavity, and the forward sub-cavity opens into an internal passage in the airfoil piece.

14. A gas turbine engine comprising:
a compressor section;
a combustor in fluid communication with the compressor section; and
a turbine section in fluid communication with the combustor,
at least one of the turbine section or the compressor section including an airfoil having
an airfoil section defining an airfoil profile,
a first endwall piece including a first cup portion defining a first cavity,
a second endwall piece including a second cup portion defining a second cavity and an airfoil wall portion projecting from the second cup portion, the airfoil wall portion forming a portion of the airfoil profile of the airfoil section, the airfoil wall portion including a border wall that is sloped, the border wall being disposed in the first cavity and partitioning the first cavity into a cooling passage, and
an airfoil piece defining another portion of the airfoil profile, the airfoil piece having first and second ends, the first end being disposed in the first cavity and the second end being disposed in the second cavity such that the airfoil piece is trapped between the first endwall piece and the second endwall piece, wherein at least one of the first cup portion or the second cup portion includes a shoulder supporting the airfoil piece, and the one of the first cup portion or the second cup portion that includes the shoulder additionally includes a rib supporting the airfoil piece.

15. The gas turbine engine as recited in claim 14, wherein the airfoil piece forms a leading end of the airfoil profile.

16. The gas turbine engine as recited in claim 14, wherein the airfoil wall portion has a lip that is bottomed out in the first cavity.

17. The gas turbine engine as recited in claim 16, wherein the airfoil wall portion includes a shoulder that abuts the first endwall piece such that an exterior airfoil surface of the airfoil wall portion is substantially flush with an exterior endwall surface of the first endwall piece.

18. An airfoil article comprising:
an endwall piece including a cup portion defining a cavity and an airfoil wall portion projecting from the cup portion, the airfoil wall portion forming a portion of an airfoil profile, wherein the cup portion includes a shoulder and a rib for supporting an airfoil piece received into the cup portion, the airfoil wall portion including a border wall that is sloped, the border wall being disposed in the cavity and partitioning the cavity into a cooling passage.

19. The airfoil article as recited in claim 18, wherein the airfoil wall portion forms a suction side or a pressure side of the airfoil profile.

20. The airfoil article as recited in claim 19, wherein the airfoil wall portion excludes a leading end of the airfoil profile.

* * * * *